US012586149B2

(12) United States Patent
Chou et al.

(10) Patent No.: US 12,586,149 B2
(45) Date of Patent: Mar. 24, 2026

(54) MIXED REALITY RECORDING OF FOVEATED DISPLAY CONTENT SYSTEMS AND METHODS

(71) Applicant: Apple Inc., Cupertino, CA (US)

(72) Inventors: Jim C Chou, San Jose, CA (US); Yung-Chin Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 18/325,434

(22) Filed: May 30, 2023

(65) Prior Publication Data

US 2024/0403999 A1 Dec. 5, 2024

(51) Int. Cl.
| *G06T 3/40* | (2024.01) |
| *G06F 3/01* | (2006.01) |
| *G06F 3/147* | (2006.01) |
| *G06T 7/11* | (2017.01) |

(52) U.S. Cl.
CPC ................ *G06T 3/40* (2013.01); *G06F 3/013* (2013.01); *G06F 3/147* (2013.01); *G06T 7/11* (2017.01); *G06T 2207/20132* (2013.01)

(58) Field of Classification Search
CPC ....................................................... G06T 3/40
See application file for complete search history.

(56) References Cited

U.S. PATENT DOCUMENTS

| 11,438,603 B2 | 9/2022 | Kalva et al. |
| 2013/0321598 A1 | 12/2013 | Inoue et al. |

| 2017/0085881 A1 | 3/2017 | Atkins et al. |
| 2017/0236252 A1 | 8/2017 | Nguyen et al. |
| 2017/0244867 A1 | 8/2017 | Yasutomi |
| 2017/0287112 A1 | 10/2017 | Stafford et al. |
| 2018/0284872 A1 | 10/2018 | Schluessler et al. |
| 2019/0043167 A1* | 2/2019 | Steyskal ............ G02B 27/0172 |
| 2019/0281279 A1 | 9/2019 | Peuhkurinen et al. |

(Continued)

FOREIGN PATENT DOCUMENTS

| CN | 111989920 A | 11/2020 |
| CN | 114982229 A | 8/2022 |

OTHER PUBLICATIONS

Office Action for Taiwanese Patent Application No. 113119935 dated Feb. 25, 2025; 12 pgs.

(Continued)

*Primary Examiner* — Shivang I Patel
(74) *Attorney, Agent, or Firm* — Fletcher Yoder, P.C.

(57) ABSTRACT

A system may include a display for displaying an image frame that is divided into regions having respective resolutions based on display image data. The system may also include image processing circuitry to generate the display image data based on multi-resolution image data and generate record image data based on the multi-resolution image data. Generating the record image data may include obtaining boundary data indicative of locations of boundaries between the regions resampling the multi-resolution image data based on the boundary data. Resampling the multi-resolution image data may include performing a first resampling on a first portion of the multi-resolution image data corresponding to a first region and performing a second resampling, different from the first resampling, on a second portion of the multi-resolution image data corresponding to a second region.

20 Claims, 7 Drawing Sheets

(56)     References Cited

U.S. PATENT DOCUMENTS

| | | | |
|---|---|---|---|
| 2019/0379893 A1* | 12/2019 | Krishnan | ............ H04N 19/198 |
| 2020/0012106 A1 | 1/2020 | Shpunt | |
| 2020/0227010 A1 | 7/2020 | Holland et al. | |
| 2020/0374552 A1 | 11/2020 | Skupin et al. | |
| 2021/0027751 A1 | 1/2021 | Tang et al. | |
| 2021/0098535 A1 | 4/2021 | Cai et al. | |
| 2022/0377317 A1 | 11/2022 | Sánchez et al. | |

OTHER PUBLICATIONS

International Search Report and Written Opinion for PCT Application No. PCT/US2024/029140, dated Sep. 3, 2024; 12 pgs.

* cited by examiner

MIXED REALITY RECORDING OF FOVEATED DISPLAY CONTENT SYSTEMS AND METHODS

BACKGROUND

This disclosure relates to image data processing and recording or otherwise outputting image data corresponding to variable resolution content to be displayed on an electronic display, such as a foveated display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. In some scenarios, such as in virtual reality, mixed reality, and/or augmented reality, an image frame of the image data to be displayed may be blended from multiple sources. Moreover, the image data may be processed to account for one or more physical or digital effects associated with generating/displaying the image data. Furthermore, the image data may be formatted in multiple resolutions, such as for a foveated display that displays multiple different resolutions of an image at different locations on the electronic display depending on a viewer's gaze or focal point on the display. However, recording of foveated image data, such as for playback on a non-foveated display, may lead to undesired noticeability of the multiple different resolutions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to recording or otherwise outputting image data that corresponds to variable resolution content (e.g., foveated display content) to be displayed on an electronic display, such as a foveated display. Multi-resolution image data is arranged such that different portions of the display simultaneously display content at different resolutions. For example, different resolutions may be displayed at different areas of the display based on a focal point of a viewer's gaze, such that the image content is displayed at a higher resolution towards the focal point (e.g., where a viewer's eye may have higher acuity) and a lower resolution away from the focal point (e.g., where a viewer's eye may have lower acuity). As such, adjustable regions (e.g., based on the focal point) of different size pixel groupings (e.g., resolutions) are established for each image frame identifying the content resolution for different portions of the electronic display. While not limited to such implementations, such displays may be utilized for virtual reality, mixed reality, and/or augmented reality, where the viewer's eye movement may be tracked. For example, the electronic display may be implemented as wearable glasses/goggles.

While content is output in a multi-resolution format (i.e., a format having different content resolutions at different locations within a single image frame) to an electronic display for viewing, it may be desired to record all or a portion of the displayed content and/or output the same to a different electronic display (e.g., for display at a consistent resolution across the display panel/image frame). In some embodiments, image processing circuitry may include a record block that receives the image data in the multi-resolution format and outputs the image data in a single resolution format for writing to memory and/or output to an additional electronic display. For example, the record block may dynamically resample (vertically resample and/or horizontally resample) different portions of the multi-resolution image data to generate a consistent resolution image frame to be output to memory or the additional electronic display. Indeed, boundary data indicative of the boundaries between the adjustable regions or otherwise demarcating the changes in content resolution may be used to perform the dynamic resampling in the corresponding adjustable regions. As should be appreciated, the different adjustable regions of image data in the multi-resolution format may be upsampled or downsampled based on their individual, initial resolution to match the output resolution of the record block.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
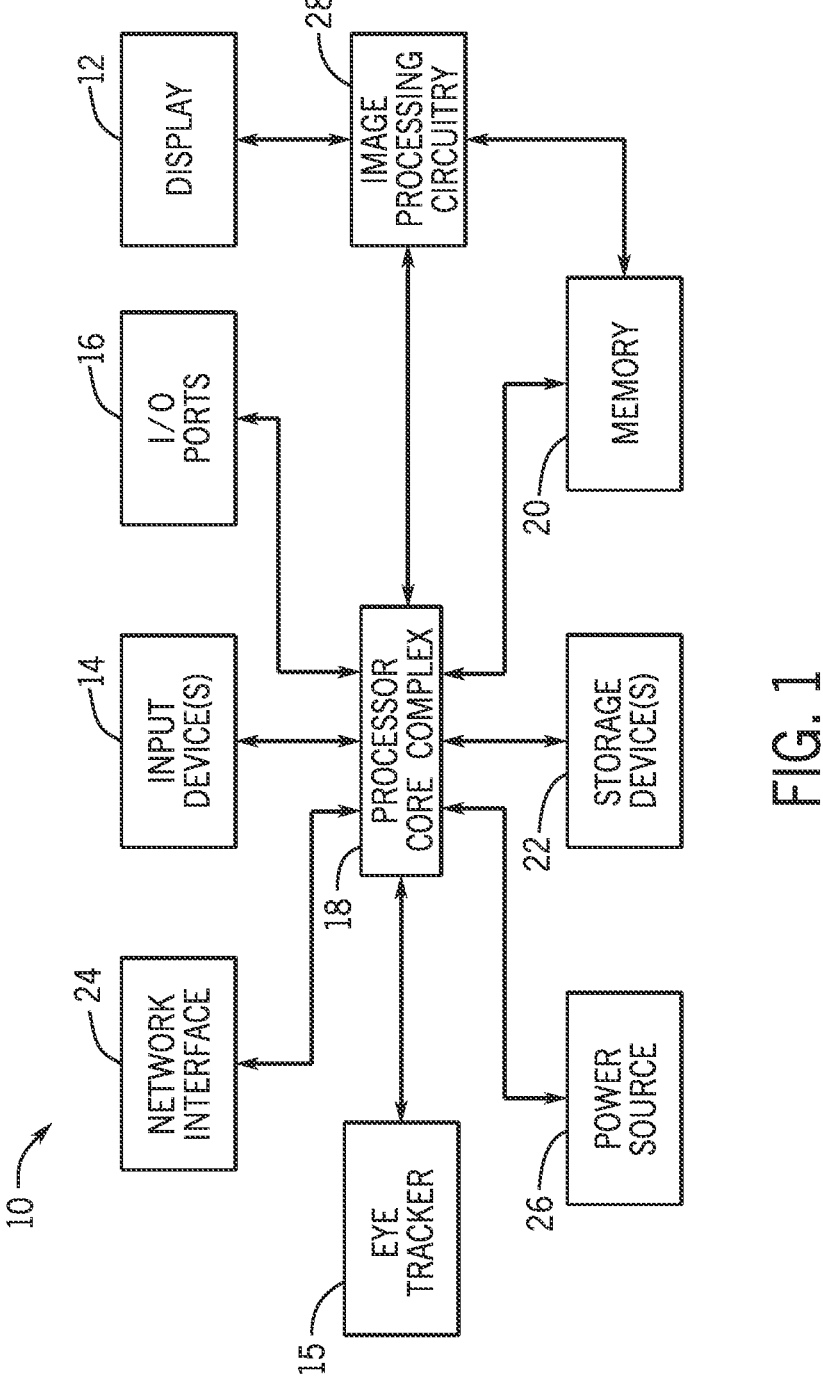
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence of variation in luminance emitted by different red, green, and blue display pixels, the collective color) of its display pixels based on corresponding image data received at a particular resolution. For example, an image data source may provide image data as a stream of pixel data, in which data for each display pixel indicates a target luminance (e.g., brightness) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV), grayscale (e.g., gray level), or other color basis. It should be appreciated that a luma channel, as disclosed herein, may encompass linear, non-linear, and/or gamma-corrected luminance values.

Furthermore, the image data may be formatted in multiple resolutions, such as for a foveated display that displays image content at multiple different resolutions at corresponding different locations on the electronic display depending on a viewer's gaze or focal point on the electronic display. For example, different resolutions may be displayed at different areas of the electronic display based on a focal point of a viewer's gaze, such that the image content is displayed at a higher resolution towards the focal point (e.g., where a viewer's eye may have higher acuity) and a lower resolution away from the focal point (e.g., where a viewer's eye may have lower acuity). As such, adjustable regions (e.g., based on the focal point) of different size pixel groupings are established for each image frame identifying the content resolution for different portions of the electronic display. While not limited to such implementations, such displays may be utilized for virtual reality, mixed reality, and/or augmented reality, where the viewer's eye movement may be tracked. For example, the electronic display may be implemented as wearable glasses/goggles. As should be appreciated, the multi-resolution image data discussed herein may be displayed on any suitable electronic display (e.g., an electronic display having a fixed or varying physical pixel density and/or an electronic display that applies foveation via pixel circuitry).

Additionally, image processing circuitry may enhance, compensate, scale, etc. image data for an improved viewing experience. For example, the image data may be processed to account for one or more physical or digital effects associated with displaying the image data. In some embodiments, image processing circuitry may perform blending and/or warping of image data to generate image content from multiple sources (e.g., generated content, captured content via a camera) and/or perform compensations for display related effects such as burn-compensation, color management, etc.

As discussed herein, while content may be processed (e.g., via the image processing circuitry) and output in a multi-resolution format to an electronic display (e.g., having a fixed or varying physical pixel density) for viewing, it may be desired to record all or a portion of the content and/or output the same to a different electronic display, such as where no foveation (or a different arrangement of foveation) is desired. As such, in some embodiments, the image processing circuitry may include a record block that receives the image data in the multi-resolution format and outputs the image data in a single resolution format (e.g., consistent resolution across the image frame) for writing to memory and/or output to the different electronic display. Moreover, in some embodiments, the record block may be disposed logically between the generation of the image content and display specific compensations. For example, the record block may be disposed after image blending and warping of the image data and before panel compensation such as burn-in compensation (e.g., compensation for aging of display pixels).

To record the displayed content, the record block may dynamically resample (vertically resample and/or horizontally resample) different portions of the multi-resolution image data to generate a consistent (e.g., single) resolution image frame to be output to memory or the different electronic display. Indeed, boundary data indicative of the boundaries between the adjustable regions or otherwise demarcating the changes in content resolution may be used to perform the dynamic resampling in the corresponding adjustable regions.

Furthermore, in some embodiments, the multi-resolution image data may be cropped to include certain portions of the content, which may correspond to particular adjustable regions having resolutions greater than a threshold. For example, in some embodiments, adjustable regions containing image data downsampled by a factor of two (relative to the resolution at the focal point) may be output from the record block at the same resolution, image data with higher resolutions may be downsampled to match, and image data with lower resolutions may be cropped. Additionally or alternatively, image data with lower resolutions may be upsampled and/or enhanced to match the output resolution of the record block. As should be appreciated, the different adjustable regions of image data in the multi-resolution format may be upsampled or downsampled based on their individual, initial resolution to match the output resolution of the record block.

With the foregoing in mind, FIG. 1 is an example electronic device 10 with an electronic display 12 having independently controlled color component illuminators (e.g., projectors, backlights). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, an eye tracker 15, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors such as reduced instruction set computing (RISC) processors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. For example, when a portable storage device is connected, the I/O port 16 may enable the processor core complex 18 to communicate data with the portable storage device. Moreover, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

Additionally, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement). As used herein, a display pixel may refer to a collection of sub-pixels (e.g., red, green, and blue subpixels) or may refer to a single sub-pixel.

The eye tracker 15 may measure positions and movement of one or both eyes of someone viewing the electronic display 12 of the electronic device 10. For instance, the eye tracker 15 may include a camera that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. The processor core complex 18 may use the gaze angle(s) of the eyes of the viewer when generating/processing image data for display on the electronic display 12.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
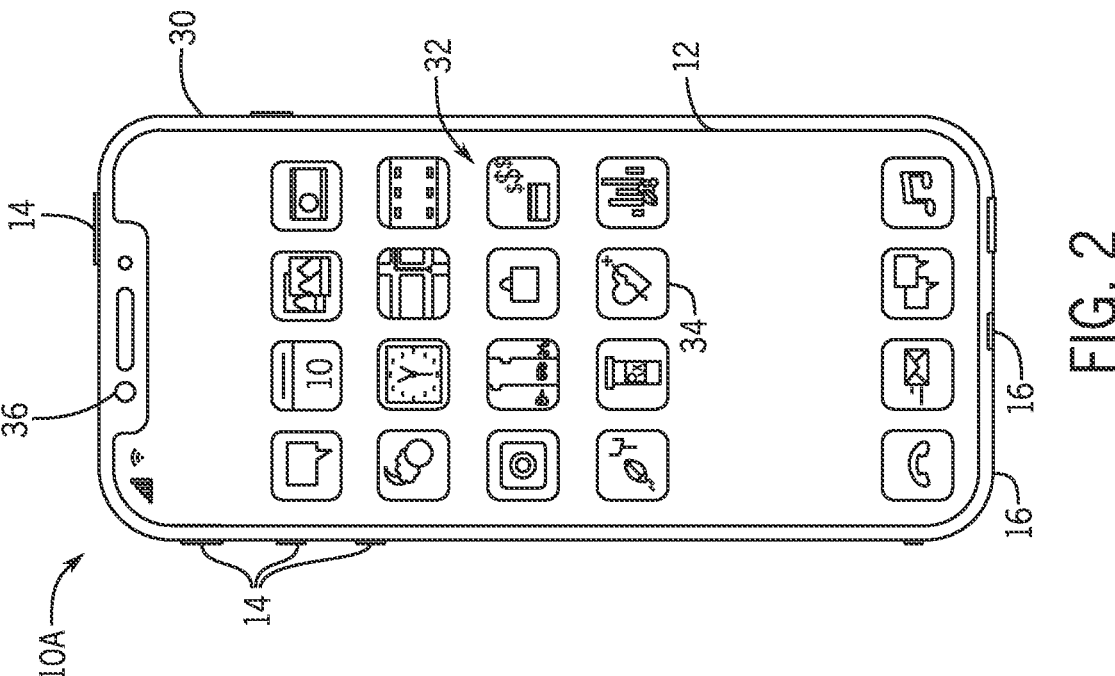
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
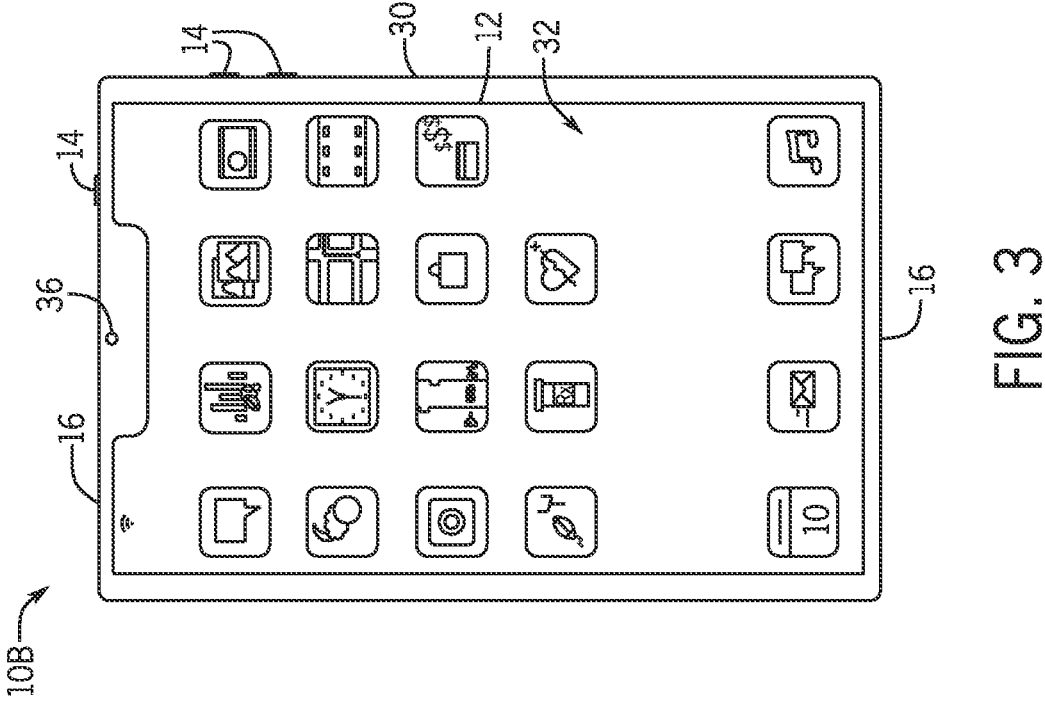
FIG. 3 is another example of the electronic device of FIG. 1 in the form of a tablet device, in accordance with an embodiment.
Figure 4:
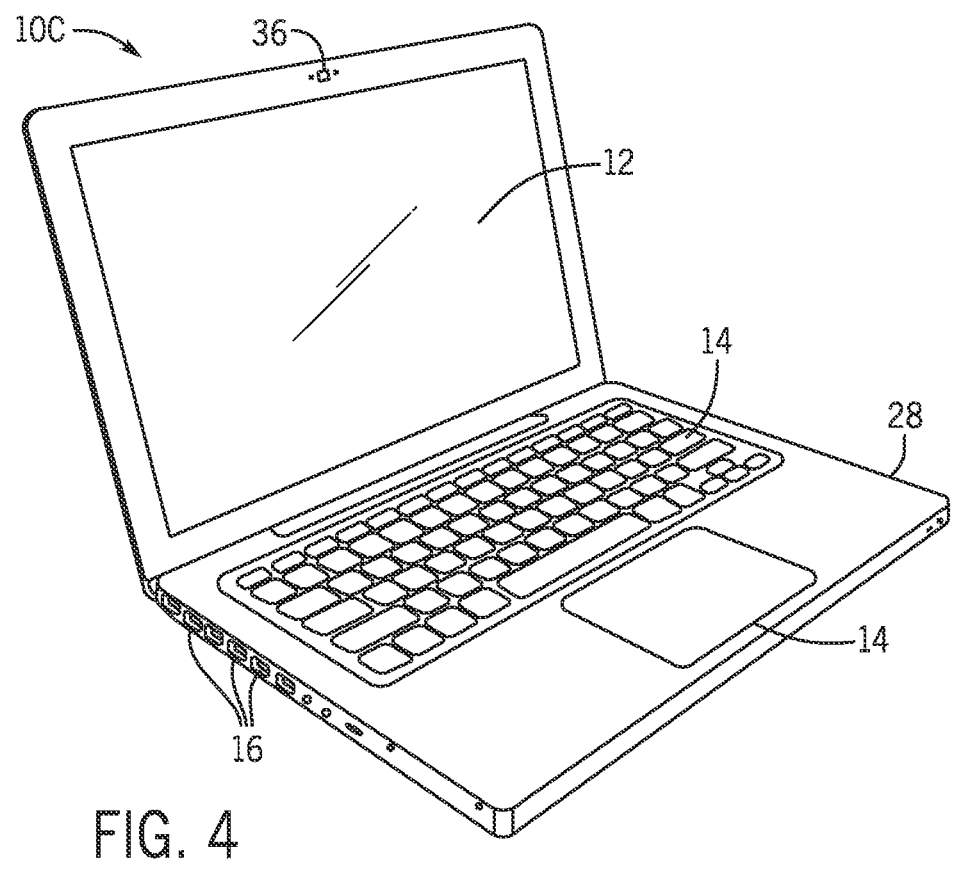
FIG. 4 is another example of the electronic device of FIG. 1 in the form of a computer, in accordance with an embodiment.
Figure 5:
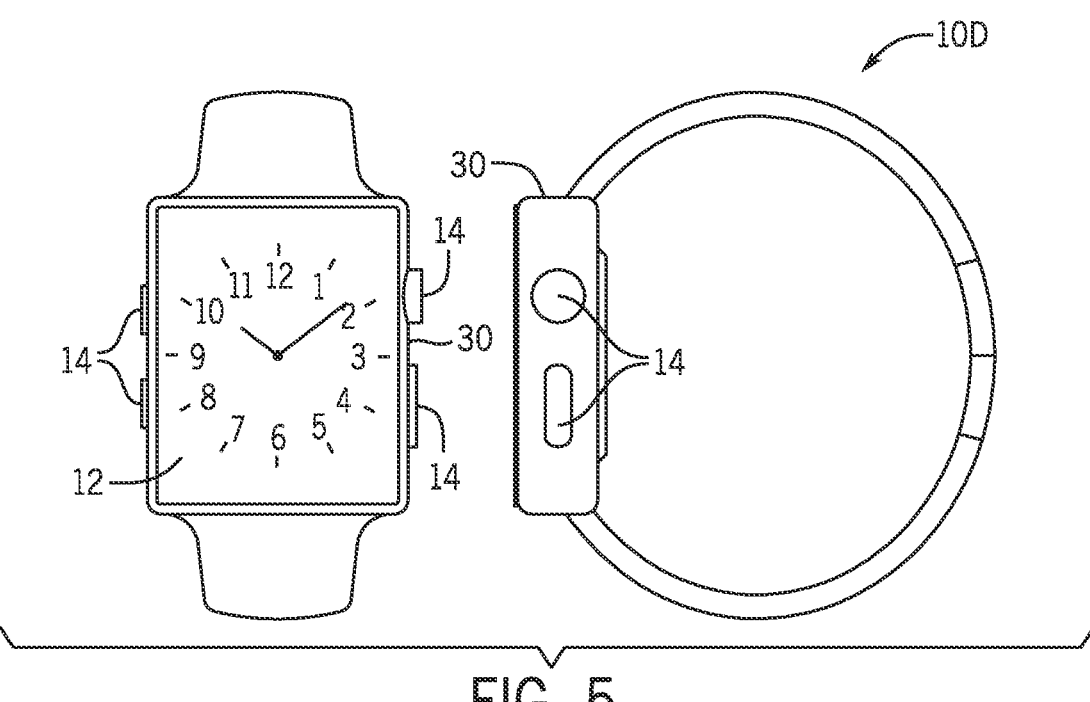
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
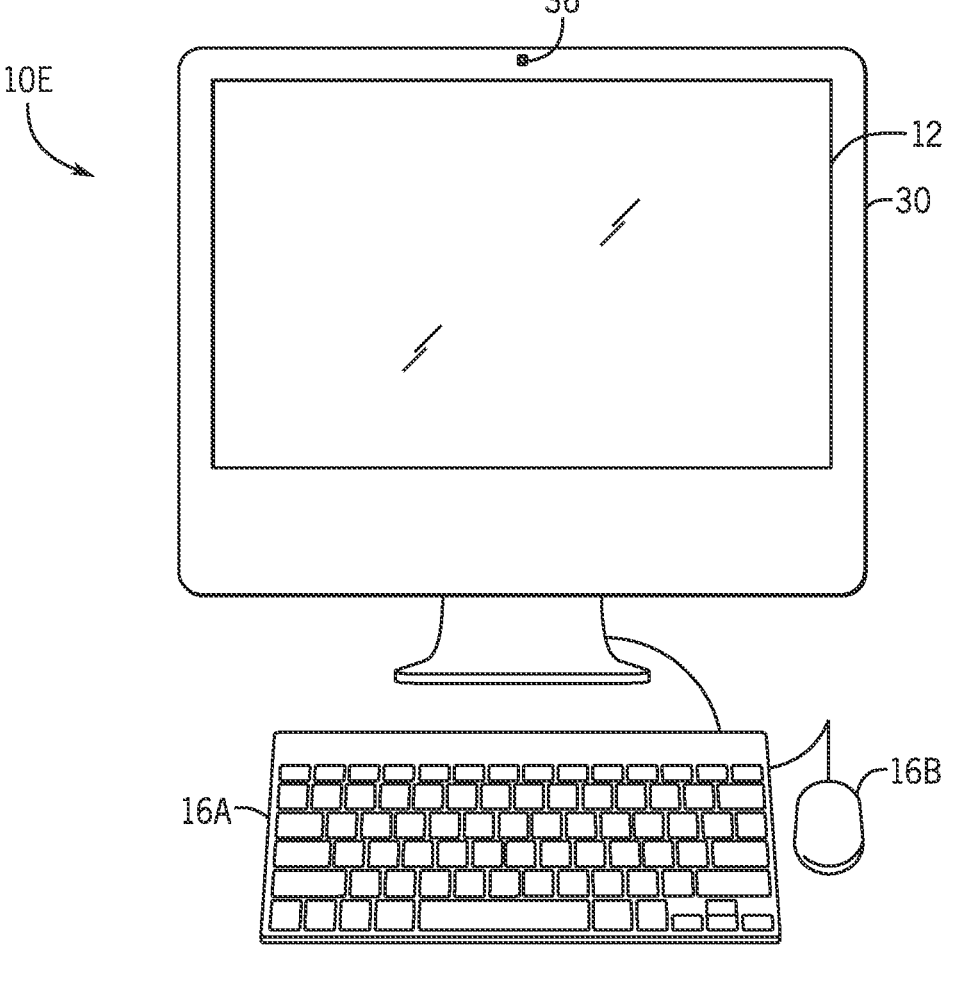
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
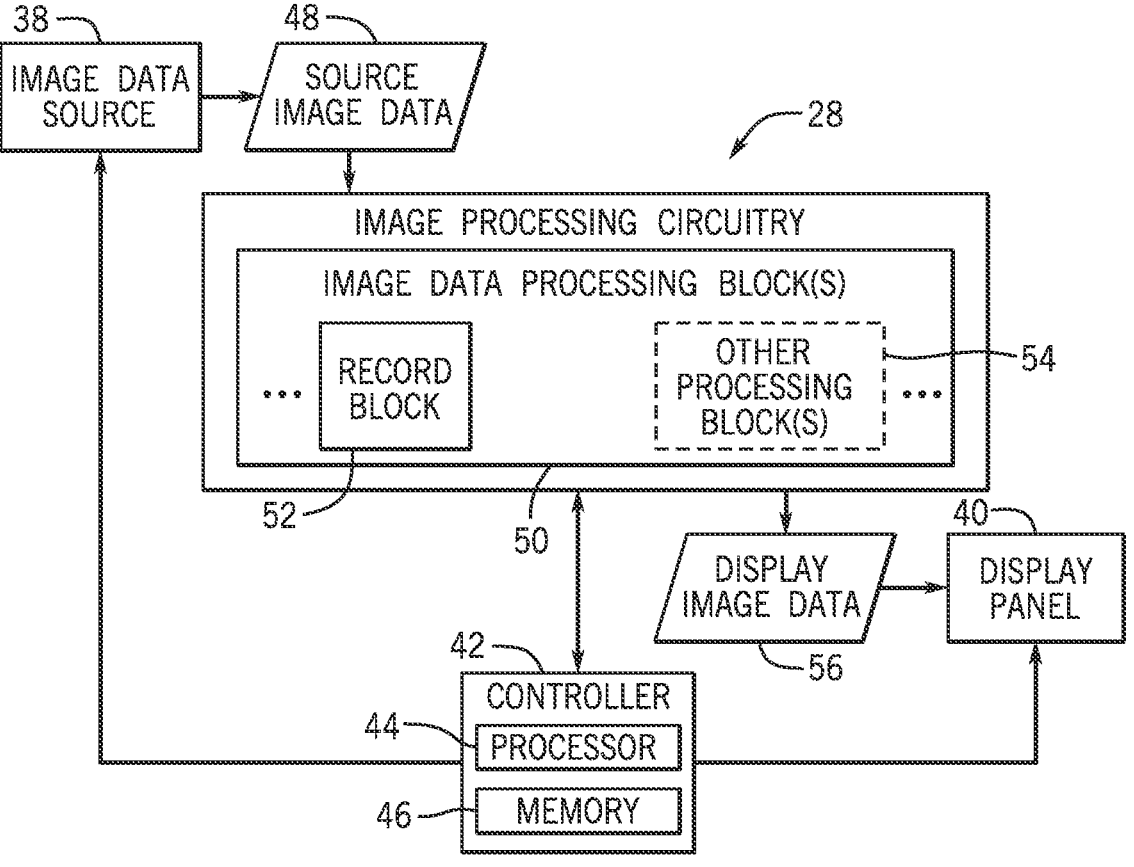
FIG. 7 is a schematic diagram of the image processing circuitry of FIG. 1 including a record block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display panel (e.g., OLED, LED, μLED, μOLED), transmissive display panel (e.g., a liquid crystal display (LCD)), a reflective technology display panel (e.g., DMD display), or any other suitable type of display panel 40. In some embodiments, the controller 42 may control operation of the image processing circuitry 28, the image data source 38, and/or the display panel 40. The controller 42 may include a controller processor 44 and/or controller memory 46. The controller processor 44 may be any suitable microprocessor, such as a general-purpose microprocessor such as a reduced instruction set computing (RISC) processor, an application specific integrated circuit (ASIC), a field programmable gate array (FPGA), or any combination thereof. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a record block 52. As should be appreciated, multiple other image processing blocks 54 may also be incorporated into the image processing circuitry 28, such as a pixel contrast control (PCC) block, a burn-in statistics (BIS)/burn-in compensation (BIC) block, a color management block, a dither block, a blend block, a warp block, a scaling/rotation block, etc. before and/or after the record block 52. The image data processing blocks 50 may receive and process source image data 48 and output display image data 56 in a format (e.g., digital format, image space, and/or resolution) interpretable by the display panel 40. For example, in the case of a foveated display (e.g., an electronic display 12 outputting multi-resolution image data), the image processing blocks 50 may output display image data 56 in the multi-resolution format.

Furthermore, the functions (e.g., operations) performed by the image processing circuitry 28 may be divided between various image data processing blocks 50, and, while the term "block" and/or "sub-block" is used herein, there may or may not be a logical or physical separation between the image data processing blocks 50 and/or sub-blocks thereof. After processing, the image processing circuitry 28 may output the display image data 56 to the display panel 40. Based at least in part on the display image data 56, the display panel 40 may apply electrical signals to the display pixels of the electronic display 12 to output desired luminances corresponding to the image.

In some scenarios, the display image data 56 may be output from the image processing circuitry 28 in a multi-resolution format to an electronic display 12 to be displayed in multiple resolutions. However, such a format may be unsuitable or otherwise undesired for a recording and/or playback on a different electronic display 12. As such, the record block 52 prepares the image data to be recorded (e.g., saved to local memory 20, a main memory storage device 22) and/or sent to a different electronic display 12 separate from the electronic display 12 receiving the display image data 56. For example, the record block 52 may dynamically resample the different adjustable regions of image data to generate record image data having a consistent resolution. As such, when output to or recorded for playback on a different electronic display 12, the record image data may appear to have a consistent resolution. Moreover, in some embodiments, the record block 52 may use boundary data indicative of the boundaries between the regions of the multi-resolution image data to perform the resampling. As should be appreciated, the boundaries of the regions of the multi-resolution format may be fixed or adjustable and may be based on the specifications of the electronic display 12 that receives the display image data 56 and/or based on a viewer's focal point, which may change on each image frame.

Moreover, in some embodiments, the record block 52 may utilize image data from between the generation of the image content and display specific compensations. Indeed, display specific compensation such as burn-in compensation may be irrelevant when displayed on a different display than such compensations where designated. As such, in some embodiments, the record block 52 may be disposed after image blending and warping of the image data and before panel compensation such as burn-in compensation (e.g., compensation for aging of display pixels). Furthermore, in some embodiments, the record block 52 may be logically before a color management block, which may adjust colors of the image content for the individual display, user preferences (e.g., color alteration for the visually impaired), etc., which may be undesirable in a recording or for viewing on an alternate display. As should be appreciated, while discussed herein as "before" certain other image processing blocks 54, as should be appreciated, such relates image data being branched to the record block 52 before such other image processing blocks 54, and processing of the record block 52 and the other image processing blocks 54 may be performed in serial or parallel. Moreover, the record block 52 may provide for real-time (e.g., simultaneous or parallel) recording/outputting of generated image content of display image data 56 in a different format.

Figure 8:
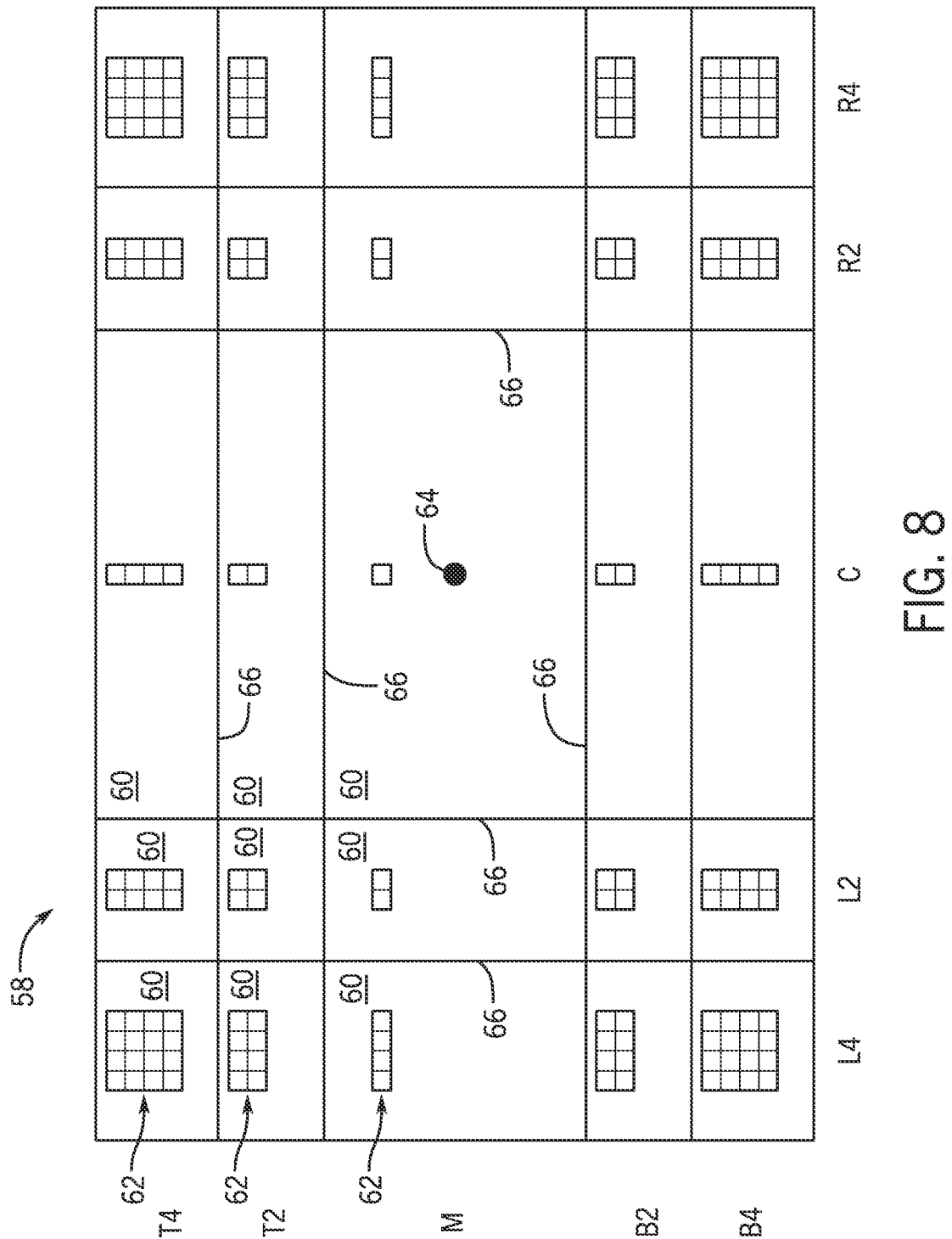
FIG. 8 is an example layout of multiple adjustable regions of pixel groupings of a foveated display, in accordance with an embodiment.

As discussed herein, when used in conjunction with a foveated display, different portions of the image data may include different content resolutions. As such, resampling of the multi-resolution image data for recording or other playback may vary based on the sizes and locations of the different content resolutions. To help illustrate, FIG. 8 is a foveated display 58 having multiple adjustable regions 60 of pixel groupings 62. In general, a foveated display 58 has a variable content resolution across the display panel 40 such that different portions of the display panel 40 are displayed at different resolutions depending on a focal point 64 (e.g., center of the viewer's gaze) of the user's gaze (e.g., determined by eye-tracking). By reducing the content resolution in certain portions of the display panel 40, image processing time and/or resource utilization may be reduced. While the human eye may have its best acuity at the focal point 64, further from the focal point 64, a viewer may not be able to distinguish between high and low resolutions. As such, higher content resolutions may be utilized in regions of the foveated display 58 near the focal point 64, while lesser content resolutions may be utilized further from the focal point 64. For example, if a viewer's focal point 64 is at the center of the foveated display 58, the portion of the foveated display 58 at the center may be set to have the highest content resolution (e.g., with 1×1 pixel grouping 62), and portions of the foveated display 58 further from the focal point 64 may have lower content resolutions with larger pixel groupings 62. In the example of FIG. 8, the focal point 64 is in the center of the foveated display 58 giving symmetrical adjustable regions 60. However, depending on the location of the focal point 64, the location of the boundaries 66 and the size of the adjustable regions 60 may vary.

In the depicted example, the foveated display 58 is divided into a set of 5×5 adjustable regions 60 according to their associated pixel groupings 62. In other words, five columns (e.g., L4, L2, C, R2, and R4) and five rows (e.g., T4, T2, M, B2, and B4) may define the adjustable regions 60. The center middle (C, M) adjustable region coincides with the focal point 64 of the viewer's gaze and may utilize the native resolution of the display panel 40 (e.g., 1×1 pixel grouping 62). Adjustable regions 60 in columns to the right of center (C), such as R2 and R4, have a reduced content resolution in the horizontal direction by a factor of two and four, respectively. Similarly, adjustable regions 60 in columns to the left of center, such as L2 and L4, have a reduced content resolution in the horizontal direction by a factor of two and four, respectively. Moreover, rows on top of the middle (M), such as T2 and T4, have a reduced content resolution in the vertical direction by a factor of two and four, respectively. Similarly, rows below the middle (M), such as B2 and B4, have a reduced content resolution in the vertical direction by a factor of two and four, respectively. As such, depending on the adjustable region 60, the content resolution may vary horizontally and/or vertically.

The pixel groupings 62 may be indicative of the set of display pixels that utilize the same image data in the reduced content resolutions. For example, while the adjustable region 60 at the focal point 64 may be populated by 1×1 pixel groupings 62, the adjustable region 60 in column L4 and row M may be populated by 4×1 pixel groupings 62 such that individual pixel values, processed as corresponding to individual pixel locations in the reduced content resolution, are each sent to sets of four horizontal pixels of the display panel 40. Similarly, the adjustable region 60 in column L4 and row T4 may be populated by 4×4 pixel groupings 62 such that pixel values are updated sixteen pixels at a time. As should be appreciated, while discussed herein as having reduced content resolutions by factors of two and four, any suitable content resolution or pixel groupings 62 may be used depending on implementation. Furthermore, while discussed herein as utilizing a 5×5 set of adjustable regions 60, any number of columns and rows may be utilized with additional or fewer content resolutions depending on implementation.

As the focal point 64 moves the boundaries 66 of the adjustable regions 60, and the sizes thereof, may also move. For example, if the focal point 64 were to be on the far upper right of the foveated display 58, the center middle (C, M) adjustable region 60, coinciding with the focal point 64, may be set to the far upper right of the foveated display 58. In such a scenario, the T2 and T4 rows and the R2 and R4 columns may have heights and widths of zero, respectively, and the remaining rows and columns may be expanded to encompass the foveated display 58. As such, the boundaries 66 of the adjustable regions 60 may be adjusted based on the focal point 64 to define the pixel groupings 62 for different portions of the foveated display 58.

As discussed herein, the pixel groupings 62 are blocks of pixels that receive the same image data as if the block of pixels was a single pixel in the reduced content resolution of the associated adjustable region 60. To track the pixel groupings 62, an anchor pixel may be assigned for each pixel grouping 62 to denote a single pixel location that corresponds to the pixel grouping 62. For example, the anchor pixel may be the top left pixel in each pixel grouping. The anchor pixels of adjacent pixel groupings 62 within the same adjustable region 60 may be separated by the size of the pixel groupings 62 in the appropriate direction. Furthermore, in some scenarios, pixel groupings 62 may cross one or more boundaries 66. For example, an anchor pixel may be in one adjustable region 60, but the remaining pixels of the pixel grouping 62 may extend into another adjustable region 60. As such, in some embodiments, an offset may be set for each column and/or row to define a starting position for anchor pixels of the pixel groupings 62 of the associated adjustable region 60 relative to the boundary 66 that marks the beginning (e.g., left or top side) of the adjustable region 60. For example, an anchor pixel at a boundary 66 (e.g., corresponding to a pixel grouping 62 that abuts the boundary 66) may have an offset of zero, while an anchor pixel that is one pixel removed from the boundary 66 (e.g., the start of the of a new adjustable region 60) may have an offset of one. As should be appreciated, while the top left pixel is exampled above as an anchor pixel and the top and left boundaries 66 are defined as the starting boundaries (e.g., in accordance with raster scan), any pixel location of the pixel grouping 62 may be used as the representative pixel location and any suitable directions may be used for boundaries 66, depending on implementation (e.g., read order).

Figure 9:
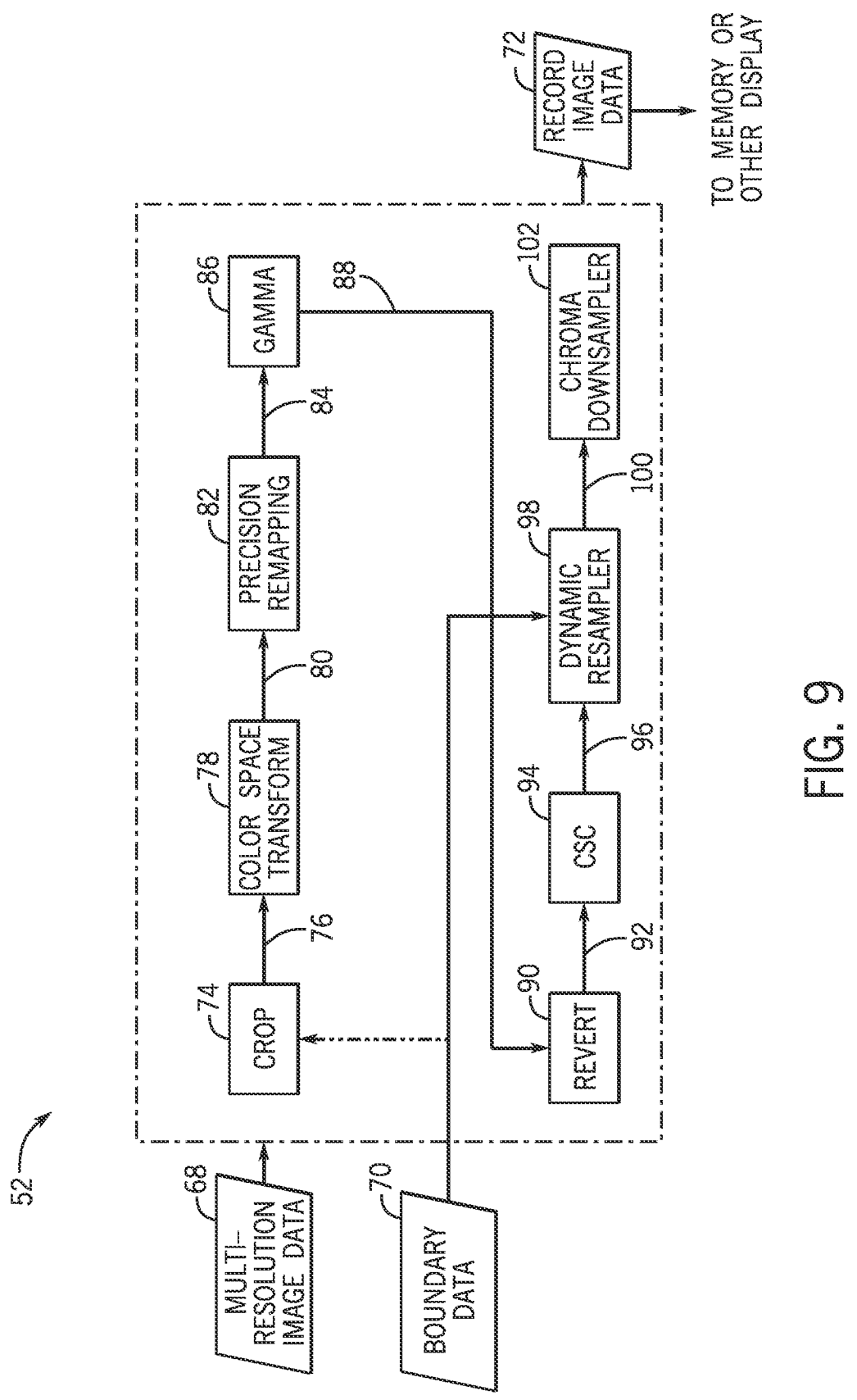
FIG. 9 is an example flow diagram of the record block of FIG. 7, in accordance with an embodiment.

With the foregoing in mind, FIG. 9 is an example flow diagram of the record block 52, which receives multi-resolution image data 68 and boundary data 70 and outputs record image data 72. As discussed above, the multi-resolution image data 68 may be at least partially processed (e.g., via other processing blocks 54 of the image processing circuitry 28) image data having image content with multiple different resolutions per image frame. Moreover, the boundary data 70 is indicative of the boundaries 66 of the adjustable regions 60 and/or the offsets associated therewith, as discussed above. As discussed below, the record block 52 may include multiple sub-blocks that may be selectively enabled or disabled to effect record image data 72 of a desired format, resolution, and precision. Furthermore, as discussed above, the multi-resolution image data 68 may be that of a mixed reality, augmented reality, or virtual reality device. As such, in some scenarios, the image processing circuitry 28 may generate/process separate image data feeds corresponding to outputs for different eyes of a user (e.g., a left eye image data feed and a right eye image data feed). As such, the sub-blocks of the record block 52 discussed below may be duplicated for parallel processing of multiple image data feeds or each feed may be processed in serial through the same set of record block sub-blocks. Additionally or alternatively, a single image data feed may be selected (e.g., left or right) to be recorded in memory or output to a non-stereoscopic display. Moreover, the rate at which image frames are recorded or output to a display other than the electronic display 12 receiving the display image data 56 may be the same as or less than the frame-rate of the electronic display 12 receiving the display image data 56. In other words, the multi-resolution image data 68 may be sampled such that the frame-rate of the record image data 72 is the same as or less than that of the display image data 56. Moreover, in some embodiments, the frame-rate of the record image data may be half that of the display image data 56 such that multiple image data feeds are recorded in serial via the same hardware.

To generate the record image data 72, in some embodiments, the multi-resolution image data 68 may be cropped (e.g., via a crop sub-block 74) to select the desired portion of the image content to be recorded and/or output to a different display (e.g., an electronic display other than that receiving the display image data 56), generating cropped image data 76. Cropping may reduce the bandwidth utilization of the image processing circuitry 28, reduce the size of the record image data 72 for storage purposes, and/or give a visual effect to the record image data 72. For example, by cropping the multi-resolution image data 68 to include the adjustable regions 60 closer to the focal point 64 while cropping adjustable regions 60 further from the focal point 64, the record image data 72 may effectively show the gaze of a user within the full image frame of the multi-resolution image data 68. In some scenarios, the cropped image data may be a sub-portion of that shown in the display image data 56. The amount of cropping may be pre-set, user selected, based on the focal point 64, and/or based on the resolutions of the multi-resolution image data 68. For example, the crop sub-block 74 may crop the multi-resolution image data 68 to include the content of a fixed- or variable-sized crop window around the focal point 64. Moreover, if the focal point 64 is proximate the edge of the electronic display 12, the crop window may change in size to maintain the focal point 64 in the center of the crop window, or the crop window may maintain size and simply abut the edge of the image frame. As should be appreciated, the crop window may include any desired portion of the image content, and may be preset, selectable, based on the focal point 64, based on the locations of the resolutions of the multi-resolution image data 68, or based on other factors.

Furthermore, in some embodiments, the crop sub-block 74 may utilize the boundary data 70 to restrict portions of the multi-resolution image data 68 corresponding to adjustable regions 60 having reduced resolutions (e.g., having a downsampled factor greater than two horizontally or vertically, greater than four horizontally or vertically). For example, if the crop window is set to exclude adjustable regions 60 having a downsampled factor greater than two, image content of the T4 and B4 rows and L4 and R4 columns (with respect to the example of FIG. 8) may be restricted from inclusion in the crop window. Additionally or alternatively, the boundaries 66 (or an offset therefrom) of the boundary data 70 may define the edges of the crop window. By maintaining higher resolution content and cropping lower resolution content, the record image data 72 may be provided at a higher resolution with less or no upscaling (e.g., increasing efficiency). As should be appreciated, while discussed herein as cropping the multi-resolution image data 68, in some embodiments, the entire image frame may be selected for the record image data 72, effectively passing through crop sub-block 74 unchanged.

In some scenarios, it may be desired to change the color space of the multi-resolution image data 68 prior to recording and/or playback on a different display. For example, the color space of the multi-resolution image data 68 may be intended for further processing via the image processing circuitry 28 and/or for use with the electronic display 12 receiving the display image data 56, but may be less ideal for a recording or for use with other displays. As such, in some embodiments, the record block 52 may include a color space transform sub-block 78 to apply a color space transformation to the image data (e.g., cropped image data 76) to generate transformed image data 80. For example, the color space transform sub-block 78 may apply a 3×3 matrix multiplication and/or offsets to the color components of the image data (e.g., cropped image data 76) to effect the color space transformation. The transformed image data 80 may have any desired color space such as NTSC-J, NTSC-FCC, sRGB, scRGB, PAL/SECAM, Apple RGB, Adobe RGB, PAL-M, HDTV, UHDTV, DCI-P3, and so on. As should be appreciated, the above RGB color spaces are given as non-limiting examples, and the transformed image data 80 may be in any desired color space.

Additionally, in some embodiments, the multi-resolution image data 68 may have a higher precision (e.g., bit-depth) than desired of the record image data 72. As such, a precision remapping sub-block 82 may reduce the precision of the image data (e.g., transformed image data 80) to generate remapped image data 84. Moreover, in some embodiments, the precision remapping sub-block 82 may change the vector format (e.g., signed to unsigned) of the image data (e.g., transformed image data 80). By reducing the precision, storage efficiency and/or transmission efficiency to a different display may be increased. The reduced precision may also reduce the hardware size and/or resource utilization of sub-blocks following the precision remapping sub-block 82.

In some embodiments, the multi-resolution image data 68 may be formatted in a linear color space. Indeed, as noted above, the multi-resolution image data 68 may be taken from an intermediate stage of the image processing circuitry 28, which may operate, at least in part, in the linear color space for increased accuracy of color corrections/compensations. However, in some scenarios, it may be desired that the record image data 72 be in a gamma encoded format. For example, gamma encoding may be desired for display on an electronic display 12 and/or for compression, which may occur when writing to local memory 20, main memory storage device 22, etc. As such, a gamma sub-block 86 may encode (e.g., via application of one or more look-up-tables (LUTs)) the remapped image data 84 to generate gamma encoded image data 88. As should be appreciated, if the multi-resolution image data 68 is already gamma encoded, the gamma sub-block 86 may be omitted or bypassed. Alternatively, a de-gamma sub-block may be implemented prior to the crop sub-block 74, color space transform sub-block 78, and/or precision remapping sub-block 82 and the gamma sub-block 86 used to re-gamma encode the image data.

A revert sub-block 90 may reduce the precision (e.g., bit-depth) of the image data (e.g., gamma encoded image data 88) to generate reverted image data 92. As should be appreciated, the precision remapping sub-block 82 and the revert sub-block 90 may be adjusted such that, in the aggregate, the precision of the multi-resolution image data 68 is reduced. In other words, precision reduction may be accomplished before and/or after gamma encoding. Moreover, the revert sub-block 90 (in conjunction with or independently from the precision remapping sub-block 82) may be programmable to offer different output precisions of the reverted image data 92 and, thus, different output precisions of the record image data 72.

In some embodiments, it may be desired to convert the color space of the multi-resolution image data 68 from an RGB color space to a different color space. For example, compression techniques for saving the record image data 72 may be more effective and/or efficient when performed in a chromatic color space, such as YCbCr, YUV, etc. As such, in some embodiments, a color space converter (CSC) sub-block 94 may convert the image data (e.g., reverted image data 92) to a chromatic or other color space, generating converted image data 96. For example, the CSC sub-block 94 may apply input offsets, a 3×3 matrix multiplication, and/or output offsets to the image data (e.g., reverted image data 92) to convert to the different color space (e.g., chromatic color space). As should be appreciated, if the multi-resolution image data 68 is already in a chromatic color space, the CSC sub-block 94 may be omitted, bypassed, or, alternatively, if the record image data 72 is desired in an RGB or other format, the CSC sub-block 94 may convert the image data into the RGB or other format.

As discussed above, the multi-resolution image data 68 includes adjustable regions 60 at different resolutions. However, it may be undesired to output image data having multiple resolutions to a different electronic display 12 or to record for playback on a different electronic display 12. For example, if foveation is not desired, multiple resolution image data may appear with noticeable variations in resolution, which may look strange or unnatural. As such, the record block 52 may include a dynamic resampler sub-block 98 to generate resampled image data 100. The dynamic resampler utilizes boundary data 70 indicative of the boundaries 66 of the adjustable regions 60 and/or the offsets associated therewith to determine which portions of the image data (e.g., converted image data 96) are at which resolutions and to resample accordingly. Downsampling and upsampling may be accomplished via any suitable method. For example, horizontal and vertical filters may be used to downsample the image data by dropping every other pixel in the horizontal and vertical directions, respectively. Furthermore, downsampling and/or upsampling may include interpolations of surrounding pixels. Moreover, the horizontal and vertical resampling may be accomplished independently and depend on the applicable boundary data 70 (e.g., indicative of the relative resolutions in the horizontal and vertical directions).

As such, different portions of the image data (e.g., converted image data 96) may be resampled in different ways for a single image frame. For example, if the image data (e.g., converted image data 96) includes portions of the multi-resolution image data 68 corresponding to adjustable regions 60 with 2×2, 2×1, 1×2, and 1×1 pixel groupings 62 and the desired output resolution is the equivalent resolution of having 2×2 pixel groupings 62, the dynamic resampler sub-block 98 may downsample the 1×1 pixel groupings 62 in the horizontal and vertical directions, the 2×1 pixel groupings 62 in the vertical direction, and the 1×2 pixel groupings 62 in the horizontal direction, while passing through the 2×2 pixel groupings 62. Similarly, if the desired output is an equivalent resolution to that of the 1×1 pixel groupings 62, the 1×2, 2×1, and 2×2 pixel groupings 62 may be upsampled accordingly and the 1×1 pixel groupings 62 may be passed through. Furthermore, in some embodiments, upsampling and downsampling may be accomplished. For example, 4×N and N×4 pixel groupings 62 may be upsampled to 2×2 pixel groupings 62 and the 2×1, 1×2, and 1×1 pixel groupings 62 may be downsampled to the 2×2 pixel groupings 62 to achieve a consistent resolution for the resampled image data 100. Indeed, a 4×1 pixel grouping 62 may be upsampled in the horizontal direction and down-sampled in the vertical direction to achieve the equivalent resolution of a 2×2 pixel grouping 62. As such, the dynamic resampler sub-block 98 may dynamically resample the image data from multiple resolutions to a single (e.g., consistent for the image frame) resolution based on the boundary data 70. As should be appreciated, the dynamic resampler sub-block 98 may generate resampled image data 100 at any suitable (e.g., desired) resolution.

In some embodiments, upsampling may be omitted (e.g., to reduce complexity, hardware footprint, processing bandwidth utilization, and/or processing time). As discussed above with regard to the crop sub-block 74, the multi-resolution image data 68 may be cropped to limit the adjustable regions 60 to those of at least a threshold resolution (e.g., having 2×2 pixel groupings 62). In other words, the resolution of the record image data 72 may be that of the lowest resolution of the cropped image data 76. For example, the image data (e.g., multi-resolution image data 68) may be cropped via the crop sub-block 74 to include content corresponding to adjustable regions with 2×2, 2×1, 1×2, and 1×1 pixel groupings 62 and exclude content corresponding to N×4 and 4×N pixel groupings 62, and the dynamic resampler sub-block 98 may downsample the 1×1 pixel groupings 62 in the horizontal and vertical directions, the 2×1 pixel groupings 62 in the vertical direction, and the 1×2 pixel groupings 62 in the horizontal direction, while passing through the 2×2 pixel groupings 62. Furthermore, the output resolution of the dynamic resampler sub-block 98 may be pre-set or selectable such that if the cropped image data 76 has a higher resolution (than the pre-set or selected resolution) the image data (e.g., the converted image data 96) is downsampled or maintained at the pre-set or selected resolution. As should be appreciated, while the pixel groupings 62 and resampling are discussed herein in factors of two, any suitable scale of multiple resolutions and resamplings may be used.

Additionally, in embodiments where the record image data 72 is output in a chromatic color space (e.g., as native from the multi-resolution image data 68 or converted via the CSC sub-block 94) the chroma channels of the image data (e.g., resampled image data 100) may be downsampled (e.g., by a factor of 1.25, 1.50, 2.00, 4.00, and so on) via a chroma downsampler sub-block 102. Chroma downsampling may be used to reduce the size of the output record image data 72 and increase memory, time, and/or processing efficiency. Indeed, the chroma channels (e.g., Cr and Cb) may have less high frequency information as compared to a luma channel (e.g., Y) of the chromatic color space and efficiency may be gained with minimal loss of quality. Moreover, in some embodiments, the chroma channels may be interleaved to further increase processing and other efficiencies.

Furthermore, although the flow diagram of the record block 52 is shown in a given order, in certain embodiments, sub-blocks may be reordered, deleted, merged, and/or selectively bypassed. For example, the color space transform sub-block 78 and/or precision remapping sub-block 82 may be disposed before the crop sub-block 74 and/or flipped in sequence. Moreover, each sub-block may be selectively enabled or disabled (e.g., via control circuitry such as the controller 42, processor 18, or other processing circuitry) and/or the extent of its effect programmable. For example, a user or output display may specify a frame-rate, a precision, an RGB or chromatic color space, and/or encoding (e.g., linear or gamma encoding), and the color space transform sub-block 78, precision remapping sub-block 82, gamma sub-block, revert sub-block 90, CSC sub-block 94, and chroma downsampler sub-block 102 may be enabled/disabled and programmed accordingly. Similarly, if the variable resolution content is desired to be displayed on a separate electronic display 12 (e.g., simultaneously or at a later time) as that which receives the display image data 56, the dynamic resampler sub-block 98 may be disabled. Indeed, in some embodiments, each sub-block may be disabled simultaneously to record the as-is multi-resolution image data 68, such as for post-processing at the full (and multi-) resolution and precision of the multi-resolution image data 68.

Additionally, it should be appreciated that the flow of the depicted sub-blocks is given as an illustrative tool and further sub-blocks may also be added depending on implementation. Furthermore, while discussed above as each sub-block operating on image data (e.g., cropped image data 76, transformed image data 80, remapped image data 84, gamma encoded image data 88, reverted image data 92, converted image data 96, and resampled image data 100) from a previous sub-block, such is given as an example, and each sub-block may operate on any suitable image data (e.g., in a reordered implementation of sub-blocks and/or if some sub-blocks are disabled). Moreover, in general, each sub-block of the record block 52 may be considered to operate on the multi-resolution image data 68 regardless of stage (e.g., regardless of previous operations performed by other sub-blocks) within the record block 52.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

an electronic display comprising a plurality of pixels and configured to display an image frame, the image frame having a plurality of resolutions based on display image data, wherein the image frame is divided into a plurality of regions having respective resolutions of the plurality of resolutions; and image processing circuitry configured to:

generate the display image data based on multi-resolution image data of the image frame; and generate record image data of a consistent resolution based on the multi-resolution image data of the image frame, wherein the record image data is different from the display image data, and wherein generating the record image data comprises:

determining boundary data indicative of locations of boundaries between the plurality of regions; and resampling the multi-resolution image data of the display image data to the consistent resolution based on the boundary data, wherein resampling the multi-resolution image data comprises performing a first resampling on a first portion of the multi-resolution image data corresponding to a first region of the plurality of regions by a first factor and performing a second resampling, different from the first resampling, on a second portion of the multi-resolution image data corresponding to a second region of the plurality of regions by a second factor.

2. The system of claim 1, wherein generating the record image data comprises cropping the multi-resolution image data to a crop window, and wherein the crop window comprises less than an entirety of the image frame.

3. The system of claim 2, wherein the crop window is centered about a focal point of a user eye gaze on the electronic display, wherein the locations of the boundaries between the plurality of regions are adjustable and based on the focal point.

4. The system of claim 2, wherein the crop window excludes a third portion of the multi-resolution image data corresponding to a third region of the plurality of regions having a respective resolution, of the plurality of resolutions, less than a threshold resolution.

5. The system of claim 1, wherein performing the first resampling comprises resampling the first portion of the multi-resolution image data by the first factor in a first direction and downsampling the first portion of the multi-resolution image data by the second factor in a second direction, and wherein performing the second resampling comprises resampling the second portion of the multi-resolution image data by the first factor in the first direction and not downsampling the second portion of the multi-resolution image data by the second factor in the second direction.

6. The system of claim 5, wherein performing the first resampling comprises upsampling the first portion of the multi-resolution image data by the first factor in the first direction.

7. The system of claim 1, wherein the consistent resolution is the same as a respective resolution of the plurality of resolutions of a third region of the plurality of regions.

8. The system of claim 1, wherein generating the record image data comprises transforming a color space of the multi-resolution image data.

9. The system of claim 8, wherein generating the record image data comprises converting the color space of the multi-resolution image data to a chromatic color space.

10. The system of claim 1, wherein generating the record image data comprises gamma encoding the multi-resolution image data.

11. Image processing circuitry comprising:

processing block circuitry configured to generate display image data based on an image frame of multi-resolution image data, wherein the image frame is divided into a plurality of regions having respective resolutions of a plurality of resolutions; and record block circuitry configured to generate record image data having a consistent resolution based on the image frame of the multi-resolution image data based on:

determining a cropped region of the image frame of the multi-resolution image data corresponding to the record image data, wherein the cropped region excludes a portion of the multi-resolution image data corresponding to a region, of the plurality of regions, having less than a threshold resolution; and resampling the multi-resolution image data of the cropped region to the consistent resolution to obtain the record image data, wherein the record image data comprises the resampled cropped region.

12. The image processing circuitry of claim 11, wherein resampling the multi-resolution image data comprises resampling the multi-resolution image data by performing a first resampling on a second portion of the multi-resolution image data corresponding to a second region of the plurality of regions and performing a second resampling, different from the first resampling, on a third portion of the multi-resolution image data corresponding to a third region of the plurality of regions.

13. The image processing circuitry of claim 11, wherein the consistent resolution comprises a lowest resolution of the cropped region.

14. The image processing circuitry of claim 11, wherein the record block circuitry is configured to generate the record image data by reducing a precision of the multi-resolution image data.

15. The image processing circuitry of claim 14, wherein the record block circuitry is configured to generate the record image data by downsampling and interleaving a first chromatic channel of the multi-resolution image data and a second chromatic channel of the multi-resolution image data and maintaining a luma channel of the multi-resolution image data.

16. A non-transitory machine-readable medium comprising instructions, wherein, when executed by one or more processors, the instructions cause the one or more processors to perform operations or to control image processing circuitry to perform the operations, wherein the operations comprise:

determining boundary data indicative of locations of boundaries between a plurality of regions, wherein the plurality of regions define areas of different content resolutions of an image frame of multi-resolution image data;

generating record image data that excludes all regions of the image frame less than a threshold resolution; and storing the record image data in a non-transitory memory, transmitting the record image data to an electronic display, or both.

17. The non-transitory machine-readable medium of claim 16, wherein the operations comprise generating display image data, based on the multi-resolution image data, to be displayed on a second electronic display, wherein the second electronic display comprises a foveated display, and wherein the locations of the boundaries of the plurality of regions are set based on a focal point of a viewer's gaze on the electronic display.

18. The non-transitory machine-readable medium of claim 16, wherein generating the record image data is based on resampling remaining regions of the image frame, wherein the resampling comprises resampling a first region of the plurality of regions by a first factor and resampling a second region of the plurality of regions by a second factor to a consistent resolution across a portion of the image frame that excludes all regions of the image frame less than the threshold resolution based on the boundary data.

19. The non-transitory machine-readable medium of claim 18, wherein resampling the multi-resolution image data comprises performing a first resampling on a first portion of the multi-resolution image data corresponding to the first region of the plurality of regions and performing a second resampling, different from the first resampling, on a second portion of the multi-resolution image data corresponding to the second region of the plurality of regions.

20. The non-transitory machine-readable medium of claim 19, wherein the first resampling comprises a downsampling in a first direction and no resampling in a second direction.

* * * * *